(12) United States Patent
Decker et al.

(10) Patent No.: US 12,398,799 B2
(45) Date of Patent: Aug. 26, 2025

(54) PLANET CARRIER FOR A TRANSMISSION

(71) Applicant: RENK GmbH, Augsburg (DE)

(72) Inventors: Peter Decker, Hannover (DE); Lutz Winter, Laatzen (DE); Thorsten Rohrmann, Binder (DE)

(73) Assignee: RENK GmbH (DE)

( * ) Notice: Subject to any disclaimer, the term of this patent is extended or adjusted under 35 U.S.C. 154(b) by 0 days.

(21) Appl. No.: 18/839,452

(22) PCT Filed: Jan. 17, 2023

(86) PCT No.: PCT/EP2023/050939
§ 371 (c)(1),
(2) Date: Aug. 19, 2024

(87) PCT Pub. No.: WO2023/160903
PCT Pub. Date: Aug. 31, 2023

(65) Prior Publication Data
US 2025/0155015 A1    May 15, 2025

(30) Foreign Application Priority Data
Feb. 22, 2022 (DE) ..................... 10 2022 104 130.1

(51) Int. Cl.
*F16H 57/08* (2006.01)
*F03D 15/00* (2016.01)

(52) U.S. Cl.
CPC .......... *F16H 57/082* (2013.01); *F03D 15/00* (2016.05); *F05B 2260/40311* (2013.01); *F16H 2057/085* (2013.01)

(58) Field of Classification Search
CPC .. F16H 57/082; F16H 2057/085; F03D 15/00; F05B 2260/40311
(Continued)

(56) References Cited

U.S. PATENT DOCUMENTS 3,303,713 A * 2/1967 Hicks ..................... F16H 1/22
74/411
3,964,334 A * 6/1976 Hicks ..................... F16H 1/2836
74/411
(Continued)

FOREIGN PATENT DOCUMENTS

AT    521071 A1   10/2019
AT    522477 A4   11/2020
(Continued)

OTHER PUBLICATIONS

CN203258045U with machine translation; Inventor: Meng; Oct. 30, 2013 (Year: 2013).*
(Continued)

*Primary Examiner* — Roger L Pang
(74) *Attorney, Agent, or Firm* — Dorton & Willis, LLP

(57) ABSTRACT

A planet carrier for a transmission, in particular for a wind power transmission, can hold a planet axle on which a planet wheel is mounted, wherein a sleeve is arranged in radial direction between the planet axle and the planet wheel. In order to be able to compensate irregularities in the toothing of the planet wheel and still require as little installation space as possible for the planet carrier a sliding layer is arranged between the sleeve on the one hand and the planet wheel on the other hand.

9 Claims, 1 Drawing Sheet

(58) Field of Classification Search
USPC ................................ 475/331, 346, 347, 398
See application file for complete search history.

(56) References Cited

U.S. PATENT DOCUMENTS

| | | | |
|---|---|---|---|
| 4,104,932 A | 8/1978 | Hansson | |
| 2003/0008748 A1* | 1/2003 | Fox | F16H 1/2836 |
| | | | 475/346 |
| 2005/0075211 A1* | 4/2005 | Fox | F16H 57/082 |
| | | | 475/348 |
| 2010/0197444 A1* | 8/2010 | Montestruc | F16H 1/2836 |
| | | | 475/331 |
| 2019/0136945 A1 | 5/2019 | Nies et al. | |
| 2021/0010462 A1* | 1/2021 | Hoelzl | F16C 33/14 |
| 2021/0122464 A1 | 4/2021 | Gilliland et al. | |
| 2023/0228255 A1 | 7/2023 | Hoelzl et al. | |

FOREIGN PATENT DOCUMENTS

| | | |
|---|---|---|
| DE | 102017110966 A1 | 11/2018 |
| DE | 102017127866 A1 | 5/2019 |
| EP | 3284975 A1 | 2/2018 |

OTHER PUBLICATIONS

German Patent Office; Examination Report in related German Patent Application No. 10 2022 104 130.1 dated Oct. 28, 2022; 5 pages.

European Patent Office; Search Report in related International Patent Application No. PCT/EP2023/050939 dated Mar. 21, 2023; 14 pages.

\* cited by examiner

PLANET CARRIER FOR A TRANSMISSION

CROSS-REFERENCE TO RELATED APPLICATIONS

This application is a national phase application under 35 U.S.C. § 371 of International Patent Application No. PCT/EP2023/050939, filed Jan. 17, 2023 (pending), which claims the benefit of priority to German Patent Application No. DE 10 2022 104 130.1, filed Feb. 22, 2022, the disclosures of which are incorporated by reference herein in their entirety.

TECHNICAL FIELD

The invention relates to a planet carrier for a transmission, in particular for a wind power transmission, by means of which at least one planet axle, on which a planet wheel is mounted, can be held or received, respectively, wherein a sleeve is arranged in radial direction between the planet axle and the planet wheel.

BACKGROUND

Planet carriers are usually components of planetary gears which are used in realizing wind power transmissions.

When designing such transmissions, it is often essential that these transmissions are exposed to high mechanical stresses, which leads to non-negligible deformation of the transmission and thus also of the planet carrier. In order to optimize the meshing and thus the transmittable power in the transmission even with these deformations, the planet axle is flexibly mounted in relation to the planet carrier.

SUMMARY

An object of the present invention is to provide a planet carrier for such a transmission, by means of which, on the one hand, the installation space required for the realization of the transmission is reduced and, on the other hand, the possibility is offered that the planet wheel, which is held by means of the planet carrier, does not pass deformations and irregularities to the toothing.

This object is achieved in accordance with the present invention in that a sliding layer is arranged between the sleeve on the one hand and the planet wheel on the other hand. This makes it possible for irregularities and deformations in the toothing of the planet wheel to be sort of buffered by the sliding layer present between the planet wheel and the sleeve. The stress peaks occurring at the planet axle and thus at the planet carrier can be reduced as a result. Due to the design as a sliding layer, only a small installation space is required.

The possibility of compensating deformations and irregularities in the toothing is considerably increased if the sleeve is made of a flexible material.

Furthermore, the flexibility of the planet carrier with regard to absorbing mechanical stress peaks can be further increased if the sleeve encompasses the planet axle held in the planet carrier, forming a free space.

Advantageously, the planet axle is only held one-sided at the planet carrier.

In order to create a stable structure despite the free space formed between the sleeve and the planet axle, it is advantageous if the sleeve and the planet axle are attached to each other at the end facing away from the planet carrier or on the side of the planet axle facing away from the planet carrier, respectively.

In order to minimize the required installation space as far as possible, it is advantageous to apply the sliding layer to the outer lateral surface of the sleeve.

This can be realized advantageously by means of an additive manufacturing process, by means of which the sliding layer is formed directly on the flexible sleeve.

A metallic coating can advantageously be provided as sliding layer.

The sliding layer can be applied to the outer lateral surface of the sleeve by means of build-up or deposition welding, respectively.

It is also possible for the sliding layer to be formed as non-metallic coating.

In order to increase the mechanical flexibility of the planet carrier and thus of the planetary gear as a whole, it is advantageous if the planet axle has a conical axial portion on its portion projecting from the planet carrier, at which its diameter decreases or is reduced, respectively, and with which an axial portion of the sleeve is associated, at which the inner diameter of the sleeve decreases or is reduced, respectively.

Advantageously, the free space between the planet axle on the one hand and the sleeve on the other hand is located in the region of this conical axial portion of the planet axle.

In order to provide a stable structure for the arrangement comprising the planet carrier and the planet wheel despite the free space between the planet axle on the one hand and the sleeve on the other hand, it is advantageous if the planet axle and the sleeve are attached to each other on the side of the conical axial portion of the planet axle facing away from the planet carrier.

In the following, the invention is explained in further detail by means of an exemplary embodiment with reference to the drawing.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
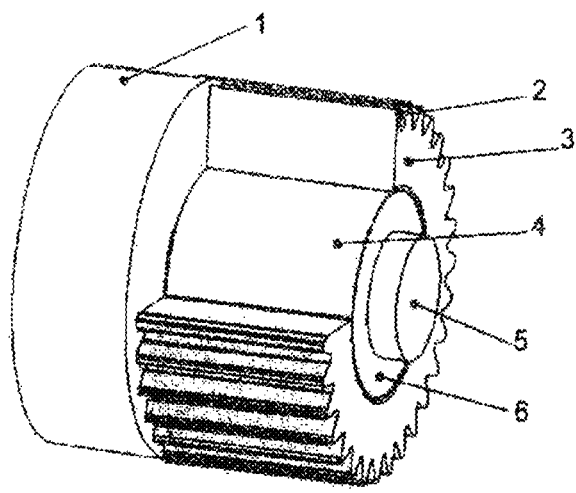
FIG. 1 shows a perspective view of an embodiment of a planet carrier according to the present disclosure for a transmission, wherein the planet carrier is only shown in part.
Figure 2:
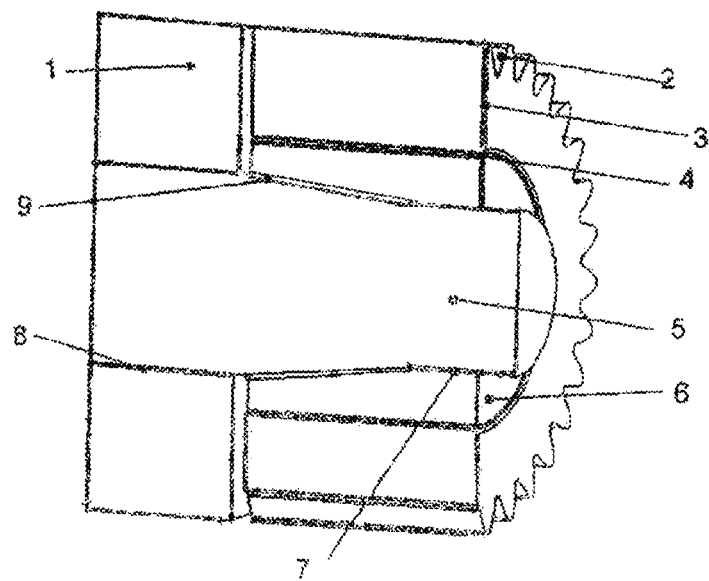
FIG. 2 shows an axial sectional view of the embodiment of the planet carrier according to the present disclosure shown in FIG. 1.

One embodiment of a planet carrier 1 according to the present disclosure, shown in principle in FIGS. 1 and 2, is part of a planetary gear not shown furthermore in the figures. Also the planet carrier 1 is shown in FIGS. 1 and 2 only in part.

A planetary axle 5 is held by means of the planet carrier 1 shown in part in FIGS. 1 and 2. In the shown embodiment of the planet carrier 1, the planet axle 5 is held by means of a shaft-hub connection 8, which can be designed detachably.

The planet axle 5 is only held one-sided at the planet carrier 1 by means of the shaft-hub connection 8.

In the embodiment shown in FIGS. 1 and 2, the planet axle 5 comprises a portion at which the diameter of the planet axle 5 gradually decreases. The decrease takes place along the region that lies between the exit of the planet axle 5 from the planet carrier 1 and an end region 7 of the planet axle 5 with a uniformly smaller diameter.

The planet axle 5 is encompassed or surrounded, respectively, by a flexible sleeve 6 at its portion projecting from the planet carrier 1. The flexible sleeve 6 comprises a corresponding sleeve portion at its axial portion associated with the tapering region of the planet axle 5, at which the inner diameter of the flexible sleeve 6 tapers accordingly. The flexible sleeve 6 coaxially encompassed or surrounds, respectively, the planet axle 5 and is firmly connected to it at the end region 7 of the planet axle 5.

A free space 9 is formed between the axial portion of the flexible sleeve 6, in which the inner diameter of the flexible sleeve 6 decreases, and the axial portion of the planet axle 5, in which the diameter of the planet axle 5 decreases. By means of the flexible sleeve 6 arranged on the planet axle 5 and the free space 9 formed between the planet axle 5 and the flexible sleeve 6—as described above—a so-called flex-pin construction is created.

A planet wheel 3 is arranged on the cylindrical outer lateral surface of the flexible sleeve 6 in the illustrated embodiment, which comprises a toothing 2 on its outer lateral surface, by means of which it is in gear connection with other components of the planetary gear comprising the planet carrier 1.

Due to the free space 9 between the inner surface of the flexible sleeve 6 and the planet axle 5, it is possible that the planet wheel 3 compensates deformations and irregularities in the toothing 2 independently or on its own, respectively.

In order to achieve this effect with as little effort as possible, a sliding layer 4 is formed on the outer lateral surface of the flexible sleeve 6, which sits between the outer lateral surface of the flexible sleeve 6 on the one hand and the inner lateral surface of the planet wheel 3 on the other hand. In the illustrated embodiment, this sliding layer 4 is applied directly to the outer lateral surface of the flexible sleeve 6.

The sliding layer 4 can be formed as metallic or non-metallic coating. By applying the sliding layer 4 directly or immediately, respectively, to the outer lateral surface of the flexible sleeve 6, the installation space required for the design of the planet carrier 1 described above is considerably reduced.

The sliding layer 4 can, for example, be formed directly on the outer lateral surface of the flexible sleeve 6 by build-up welding. Other additive manufacturing processes can also be used to apply the sliding layer 4 to the flexible sleeve 6.

At this point, it should also be noted that in the perspective view of the planet carrier 1 according to the present invention, a circumferential portion of the planet wheel 3 is omitted in order to better illustrate the arrangement of planet carrier 1, planet axle 5, flexible sleeve 6, sliding layer 4 and planet wheel 3.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A planet carrier for a transmission, comprising:
   a carrier body;
   at least one planet axle on the carrier body;
   a planet gear mounted on each at least one planet axle;
   a sleeve arranged in a radial direction between the planet axle and the planet gear; and
   a sliding layer arranged between the sleeve and the planet gear;
   wherein the planet axle has a conical axial portion in a region of the planet axle that projects from the carrier body, wherein an outer diameter of the planet axle decreases from a first diameter to a second diameter along a length of the planet axle, and then remains constant at the second diameter;
   the sleeve has a conical axial portion corresponding to the conical axial portion of the planet carrier and coterminous therewith, wherein an inner diameter of the sleeve decreases along the length of the sleeve;
   wherein the sleeve encompasses the planet axle, forming a free space therebetween in the region of the conical axial portion of the planet axle and the sleeve; and
   wherein the sleeve and the planet axle are fastened to one another on a side of the planet axle facing away from the carrier body.

2. The planet carrier of claim 1, wherein the plant carrier is configured for use in a transmission of a wind energy installation.

3. The planet carrier of claim 1, wherein the sleeve is made of a flexible material.

4. The planet carrier of claim 1, wherein the planet axle is cantilevered from the carrier body.

5. The planet carrier of claim 1, wherein the sliding layer is applied to an outer lateral surface of the sleeve.

6. The planet carrier of claim 1, wherein the sliding layer is formed directly on the flexible sleeve by an additive manufacturing process.

7. The planet carrier of claim 1, wherein the sliding layer is formed on the flexible sleeve as a metallic coating.

8. The planet carrier of claim 7, wherein the sliding layer is formed by build-up welding.

9. The planet carrier of claim 1, wherein the sliding layer is formed as non-metallic coating.

* * * * *